Nov. 20, 1923.
J. F. COMLY
1,474,579
NUT LOCK
Filed Aug. 1, 1922
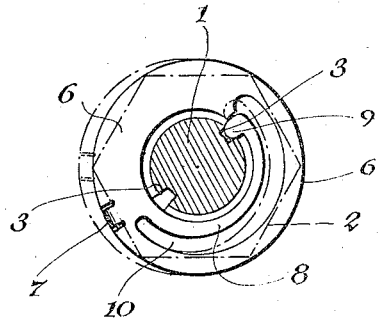
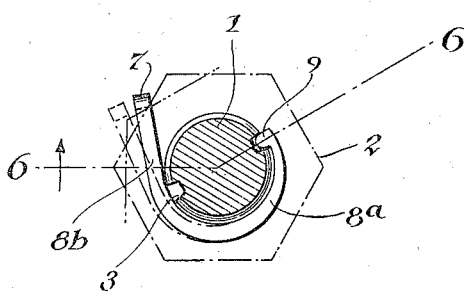
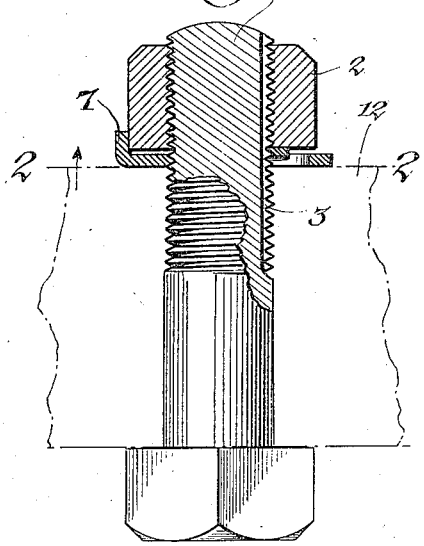
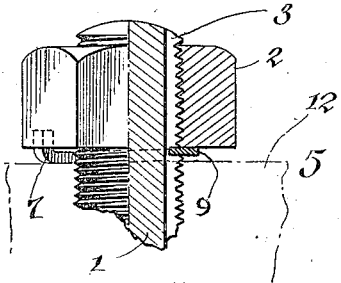
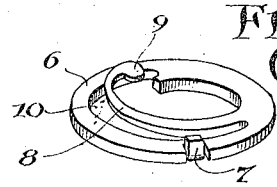
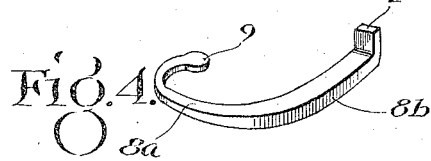
Inventor
James F. Comly.
By
Eugene E. Brown
Attorney Patented Nov. 20, 1923.

1,474,579

UNITED STATES PATENT OFFICE.

JAMES F. COMLY, OF NEW LEXINGTON, OHIO, ASSIGNOR TO ELLA P. COMLY, OF NEW LEXINGTON, OHIO.

NUT LOCK.

Application filed August 1, 1922. Serial No. 579,014.

*To all whom it may concern:*

Be it known that I, JAMES F. COMLY, a citizen of the United States, residing at New Lexington, in the county of Perry and State of Ohio, have invented certain new and useful Improvements in Nut Locks, of which the following is a specification.

This invention relates to nut locks of that class used in the assembling of machinery, structural work or railway track construction, such as shown in my prior Patent No. 1,344,534. The object of my present improvement is to simplify the construction and to greatly reduce the cost of manufacture while maintaining the same degree of efficiency in locking the nut against loosening due to jarring or accidental causes.

In my said prior patent the inner face of the nut was provided with a plurality of pockets or recesses to receive a stud which projected laterally from the washer. In my present construction, I eliminate these interfitting parts and employ the ordinary polygonal nut without any change.

In the following description I shall refer to the accompanying drawings, in which—

Figure 1 is a side elevation partly in section, of a bolt and nut with my nut locking washer applied thereto; Fig. 2 is a transverse sectional view on the line 2—2 of Fig. 1, and showing the locking washer in bottom plan view; Fig. 3 is a perspective view of the nut lock washer; Fig. 4 is a perspective view of another form of nut lock embodying my invention; Fig. 5 is a transverse sectional view on the line 5—5 of Fig. 6, showing the manner of applying said second form to a bolt and nut; and Fig. 6 is a partial side elevation, partly in section, taken on the line 6—6 of Fig. 5.

The bolt 1 and nut 2 are of the ordinary construction, the bolt having one or more longitudinal grooves 3 cut across its threads. In the form shown in Figs. 1, 2 and 3, the nut lock washer comprises a continuous annulus or ring 6 having a lug 7 struck up from its margin or periphery and an inner curved or arcuate tongue 8, having its free end formed into an inwardly projecting tooth 9. The tongue preferably tapers in width toward its free end to increase its resilience, the washer being made of spring metal. The tongue is spaced from the outer ring 6 by a space 10, formed by an arcuate groove cut in the washer and is made thinner than the ring so that it may be free to move laterally after the nut is screwed down tight into locked position. The tongue may also be laterally offset slightly as in spring washers.

In operation, as the nut 2 is screwed upon the bolt 1, the opposite faces of the locking washer will finally come into frictional contact with the inner or bottom surface of the nut and the opposite cooperative surface of the object 12 which is being secured by the bolt. The inner side of the tongue 8 hugs the bolt and the tooth or dog 9 snaps into the grooves 3 as it is carried around by the frictional engagement of the nut, assisted by the lug 7 which bears against a side face of the nut. In case the tendency of the tooth 9 to remain in a groove overcomes the tendency of the washer to rotate with the nut, the resilience of the tongue 8 permits the washer to shift laterally enough to allow the lug 7 to snap over the angles from one face of the nut to the adjacent face. When the nut is finally tight, the engagement of the tooth 9 in one of the grooves 3 and the bearing of the lug 7 against a side face of the nut constitutes a lock between the bolt and nut sufficient to prevent any retrograde movement or loosening of the latter. By reason of the fact that the tongue 8 is made thinner than the ring portion and is therefore free to move even when the nut is tight, it is possible to loosen the nut by the application of sufficient force. In this form of my nut lock, the continuous ring portion prevents the entrance of snow and sleet under the nut and thereby protects the parts of the nut lock and bolt from rust.

I have shown a simpler form of my nut lock in Figs. 4, 5 and 6, which is substantially the same as the other form with the annulus or ring portion omitted. In this form the end $8^a$, carrying the locking tooth 9, is made thinner than the other end $8^b$ which carries the lug 7. The end $8^a$ is also tapering toward the tooth 9 to make it more resilient.

The operation of the second form is substantially the same as the one first described. After the nut has been screwed down until it frictionally engages the locking member, the latter tends to move around the bolt with the nut and the tooth 9 moves into and out of the grooves 3. Finally the locking member remains in one position and as the nut is turned, the increasing frictional engagement with the end 8ᵇ tends to move the latter outwardly, as indicated in dotted lines in Fig. 6, thereby permitting the lug 7 to snap across the angle from one side face of the nut to the next. When the nut is screwed tight it will be held from accidental retrograde movement by the engagement of the tooth 9 with one of the grooves in the bolt and the pressure of the lug 7 against a side face of the nut. The thinner end 8ᵃ, however, will be free to move in case sufficient force is exerted to loosen the nut. The locking member may, therefore, be used repeatedly if desired.

I claim:—

1. The combination with a bolt having a threaded portion provided with longitudinally disposed grooves, and a polygonal nut threaded upon the bolt of a locking washer to lie between the nut and a cooperative surface, the washer having a resilient arcuate portion shaped to embrace the bolt and provided at its free end with an inwardly projecting tooth capable of removably engaging one of said grooves, and a lug struck up from the outer periphery of the washer opposite said tooth and at such a diametrical distance therefrom as to bear against one of the faces of the nut, the resilience of said arcuate portion permitting said lug to yield and snap across the successive angles on the outer periphery of the nut as it is rotated on the bolt.

2. The combination with a bolt, having a threaded portion provided with longitudinally disposed grooves, and a polygonal nut threaded upon the bolt, of a locking washer to lie between the nut and a cooperative surface, said washer having an unbroken annular margin and having an inner free resilient arcuate portion shaped to embrace the bolt and provided with a tooth to engage one of said grooves, and a lug struck up from said annular portion at such a diametrical distance from said tooth as to bear against one of the faces of the nut.

In testimony whereof I affix my signature.

JAMES F. COMLY.